Feb. 21, 1956 R. G. POOLE, JR 2,735,937
LOW-FREQUENCY OSCILLATOR
Filed March 4, 1952 2 Sheets-Sheet 1

RANDOLPH G. POOLE, JR.
INVENTOR
BY Smith & Tuck
ATTORNEYS

Feb. 21, 1956    R. G. POOLE, JR    2,735,937

LOW-FREQUENCY OSCILLATOR

Filed March 4, 1952    2 Sheets-Sheet 2

RANDOLPH G. POOLE, JR.
INVENTOR

BY Smith & Tuck
ATTORNEYS

United States Patent Office 2,735,937

Patented Feb. 21, 1956

2,735,937

LOW-FREQUENCY OSCILLATOR

Randolph G. Poole, Jr., Seattle, Wash.

Application March 4, 1952, Serial No. 274,792

7 Claims. (Cl. 250—36)

This invention is concerned with improvements in low-frequency signal generators using the RC type of oscillator, which operate in the frequency region of one cycle per second.

For making certain tests on servomechanisms, it is very necessary to have a source of sinusoidal energy the frequency of which may be varied between 100 cycles per second and 0.001 cycle per second. The signal itself should be a pure sine wave, which by the definition of a sine wave implies constant frequency and constant amplitude.

To attempt to adapt the conventional oscillator circuits to operation in this low-frequency region by merely using larger electrical components to lower the frequency, invariably results in severe distortion of the wave form due to utter failure of the amplitude control circuits primarily because of sufficient thermal lag. In addition, the signal generator would become bulky and expensive as a result of the bulky and expensive paper or oil-filled condensers which would be necessary. This situation arises when it becomes impractical, in the subsonic frequency region, to effect frequency control by variable condensers because of their size. It then becomes necessary to control frequency by variable resistors. In the higher frequency regions it is quite practical to used fixed resistances of the order of megohms so that the variable condensers may be small. However, when variable resistances are used for frequency control and a reasonable accuracy of repeat settings is necessary then instead of being in the megohms bracket, about the highest practical variable resistance is around 200,000 ohms. To obtain a given low frequency, this necessitates a sizable increase in the condensers. For example, in an RC oscillator of the Wein-bridge type using 200,000 ohm variable resistors for frequency control, it is necessary to use two banks of condensers of approximately eight micro-farads for a frequency of 0.1 cycle per second, and two banks of 80 micro-farads for 0.01 cycle per second, etc. Electrolytic condensers are to be avoided because of their instability with respect to aging and temperature. Obviously to reach a frequency of 0.001 cycle per second the above approach would be quite impractical.

The primary object of this invention, therefore, is to provide a low-frequency signal generator which is reasonably compact, economical to construct, and will produce a relatively pure sine wave.

Another object of this invention is to provide a method of simulating very large fixed values of admittance through the use of relatively economical and compact equipment.

A further object of this invention is to provide means for maintaining constant amplitude of the generated wave.

Other objects of the invention will become apparent to those versed in the art and the invention will be best understood by reference to the description below and in drawings, in which.

Figure 2:
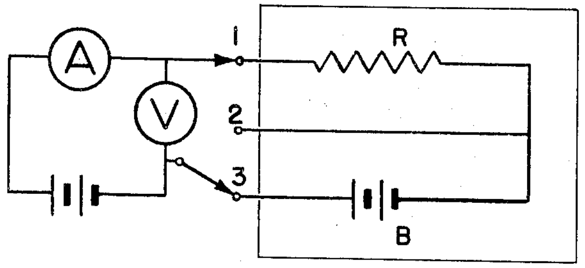
Figure 2 is a simplified circuit to illustrate one of the basic features of the invention.

Referring now to the accompanying drawings, wherein like reference numerals and symbols in the various figures designate similar circuit elements, there is shown in Figure 2 a simplified circuit diagram to illustrate one feature of this invention. In the box of Figure 2, there is a resistor R and a battery B with connections brought out to terminals 1, 2 and 3. External to the box a simple test circuit is shown which, with the aid of Ohm's law, could be used to determine the value of the resistance R if connections were made to terminals 1 and 2. If, however, the test circuit was connected to terminals 1 and 3, the resistance as indicated by the external test circuit would be very much less than that indicated across terminals 1 and 2. The above would, of course, be true only if the voltages of the two batteries were additive.

Although the above illustration used only batteries and resistance to demonstrate this phenomenon, alternating current and reactances could be used to obtain similar results. Vacuum tubes when used to produce similar phenomena are generally referred to as reactance tubes. In the circuits generally associated with vacuum tubes so used, there is usually a phase shifting network to provide a 90° leading or lagging current or voltage with respect to some reference, such as the current or voltage associated with a conventional tank circuit. In this invention no such quadrature phase shift is necessary or desirable in the amplifying equipment used to accomplish the phenomenon illustrated in Figure 2. Furthermore, the amplifying equipment so used reduces the reactance or in other words increases the admittance of a circuit by adding an additional voltage to an applied voltage and thereby causing a greater current flow through the circuit which is the equivalent of increasing the admittance of said circuit. Hence the term "admittance amplifier" is used herein to indicate the amplifying equipment associated with this phenomenon.

Figure 1:
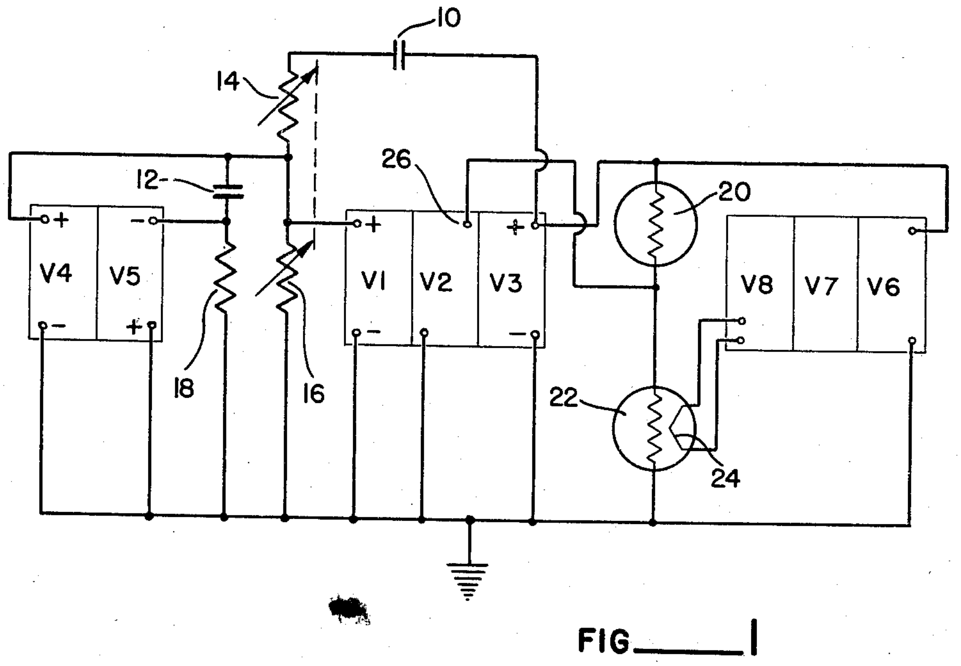
Figure 1 shows a block diagram and circuit arrangement of one form of the invention.
Figure 3:
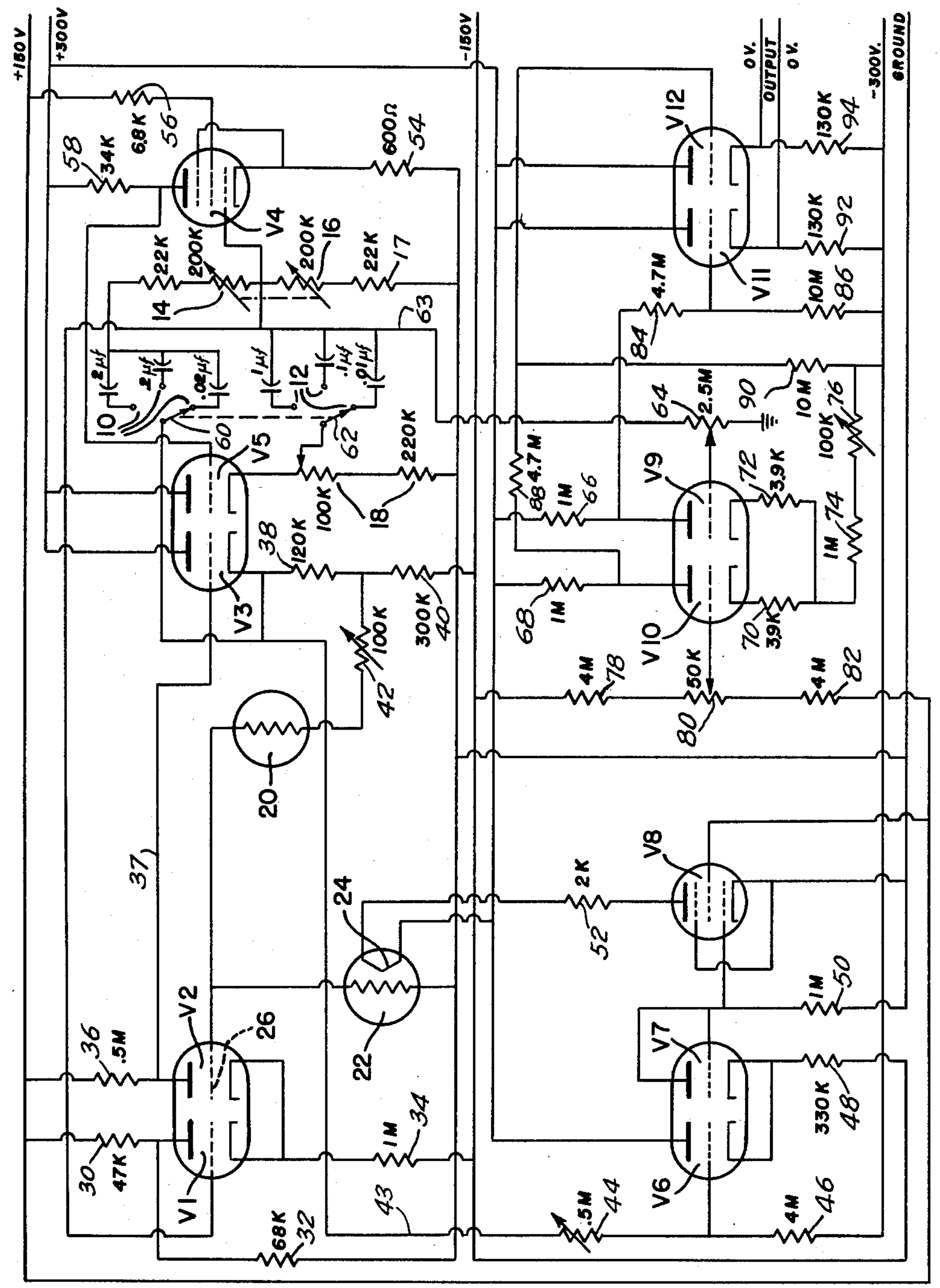
Figure 3 shows a complete circuit diagram of a preferred embodiment of the invention.

Referring to Figure 1, the basic circuit relations are shown with respect to alternating currents and voltages only. Several of the input and output terminals shown connected to a common ground may actually differ widely in their direct current potentials, as shown in Figure 3, but for simplicity these direct current potentials are ignored in Figure 1. The plus and minus signs associated with the various input and output terminals shown in Figure 1 indicate the instantaneous relative polarities of these terminals. V1, V2, and V3 represent the three vacuum tubes which maintain oscillations in the conventional Wein-bridge oscillator circuit. This oscillator network comprises the input circuit including the variable resistor 16, resistor 18, and the condenser 12, in combination with the amplifying means V1, V2, and V3, followed by the regenerative feedback circuit including the condenser 10 and the variable resistance 14. Actually V3 is only a cathode follower stage, but for simplicity it is included as a part of the amplifying means since it is necessary to obtain a low impedance output with the proper polarity for maintenance of oscillation.

In order to obtain subsonic oscillation in the Wein-bridge oscillator circuit it is necessary to make the condensers 10 and 12 as large as feasible. Frequency control is effected by means of the variable resistors 14 and 16 shown in Figure 1. To avoid the expense and bulk of large paper condensers which would be necessary for condenser 12, an admittance amplifier is used and is shown as V4 and V5 in Figure 1. Actually this amplifier consists of a one stage amplifier, V4 followed by a cathode follower coupling stage V5. The feedback voltage applied to the input circuit of V1 is also applied to the input circuit of V4. After being amplified by V4 it is coupled through V5 to the resistance 18. The voltage developed across resistance 18 is in phase with and effectively added to the original input voltage as far as condenser 12 is concerned. This is obvious upon considering the polarities indicated at the input and output of V4 and V5 respectively. In effect, this results in a greater current flow through condenser 12. It increases the charging and discharging time of the input circuit comprising condenser 12 and resistors 16 and 18. Another way of expressing the above results is to say that the circuit admittance has been increased, which is equivalent to increasing the capacitance of condenser 12. In actual practice using the circuit shown in Figure 3, a simulated increase in capacity of ten times is easily obtained. Hence this circuit is very effective in reducing the bulk and expense which would otherwise be involved if actual condensers of such large capacity were used.

To obtain the best possible sinusoidal wave form from a Wein-bridge oscillator, the amplitude of the regenerative feedback should be just barely sufficient to maintain oscillation. To maintain such a condition automatically, the usual practice heretofore has been to use a fixed positive feedback circuit and a negative feedback circuit with self adjusting means for controlling its degenerative effect. The self adjusting means very often took the form of a small lamp, the resistance of which was quite sensitive to changes in signal amplitude. In the audible frequency region and above, such a control is quite satisfactory, but in the subsonic frequency region, the lack of thermal lag renders such control useless. Hence it was necessary to devise an amplitude control circuit which has a long thermal-time constant compared to the period of oscillation.

In Figure 1 the output terminals of V3 are shown connected across a voltage divider comprising thermistors 20 and 22. The junction point between thermistors 20 and 22 is connected to the negative feedback grid terminal 26 of V2. In other words the voltage developed across thermistor 22 is fed into vacuum tube V2. By inspection of Figure 3 it will be seen that if a positive signal pulse is fed into the grid of V1, cathode coupled into V2, and then passed into the grid of V3, the signal output from the cathode of V3 will also be positive. However, if a positive signal pulse is fed into the grid of V2, then the output of V2 will be a negative signal pulse. In other words, when a portion of the output of V3 is fed back into the grid of V2 it has a degenerative effect. Therefore it is only necessary to control the degree of feedback into the feedback grid terminal 26 of V2. Since the voltage dividing degenerative feedback network comprises thermistors 20 and 22, or other thermal-sensitive resistance elements, it is only necessary to vary the temperature of at least one of said thermistors in order to alter the voltage dividing characteristic of the network and hence the voltage fed into terminal 26 of V2. To do this with reference only to the oscillation amplitude, and to be relatively independent of frequency, a circuit was devised wherein the heating coil 24, associated with thermistor 22, was supplied with a current, the root-mean-square of which is inversely proportional to only the amplitude of the oscillations.

This latter feature is obtained by selecting a portion of the output voltage of V3 and amplifying same in V6. The output of V6, referring to Figures 1 and 3, is cathode coupled into V7 which is a diode, or rectifier, biased for base clipping and adapted to feed only negative pulses into the grid of V8. V8 is a saturated pentode by virtue of a high grid resistance, which limits its plate current to a reasonable value when its grid receives no signal pulses. The negative signal pulses received on the grid of V8 from V7 serve to decrease the root-mean-square of the plate current in V8 in proportion to the amplitude of said negative pulses. The plate current of V8 is passed directly through the resistive heater coil 24, which by virtue of its heating effect upon thermistor 22 in turn controls the degenerative feedback characteristic of the voltage divider 20, 22. In other words, the electrical energy amplifying and control means comprising V6, V7, and V8, the heating coil 24, and the voltage divider 20, 22 constitute a degenerative and feedback control network which causes a voltage to react upon the control grid 26 of V2 in such a way that deviations in the amplitude of the output voltage of V3 are opposed or minimized, thereby maintaining a nominally constant output from V3.

If but a single thermistor were used with an additional conventional resistor for the voltage 20, 22, the voltage dividing characteristic would change with ambient temperature changes. By using two thermistors of similar characteristics, the effects of ambient temperature are minimized.

Figure 3 shows an actual circuit diagram of a preferred embodiment of this invention. The salient features have all been discussed above, however, a few items of interest will be obvious to those versed in the art such as the fact that all energy transfer from tube to tube and stage to stage is accomplished by conductive coupling, except in the Wein-bridge tuning network, as would be expected in this low-frequency region. It will also be noted that to obtain a reasonable power output from the oscillator, and to obtain a push-pull output two stages of direct coupled push-pull amplification are used, involving the tubes V9, V10, V11, and V12. V11 and V12 are really a push-pull cathode follower stage which results in an output with reasonably good regulation.

The values of various parts such as resistors and condensers in a specific embodiment of the invention, is shown in Figure 3. Relative voltages in the circuit are partially indicated therein. A model employing equipment as shown in Figure 3 has been successfully used. The frequency of operation of the signal generator was continuously variable over an approximate ten-to-one range. A decade multiplier switch with three positions provided a frequency multiplying factor of one-tenth, one, or ten. By using both controls, the output frequency could be continuously varied from one-tenth of one cycle per second to ninety-five cycles per second. The output signal was sinusoidal and contained a maximum of about two per cent total distortion over its entire frequency range. Its amplitude was continuously variable from zero to fifteen volts peak-to-peak. The signal was push-pull, balanced with respect to ground, and at zero volts D.-C. level, with slight modification the circuit may be used to generate sinusoidal oscillation at a frequency as low as 0.01 cycle per second. This change does not appreciably affect the circuit stability or the output waveform.

This model was developed for the experimental determination of the system transfer function of any servomechanism, except the carrier-type servo, over the frequency range of one-hundredth of one cycle per second to ninety-five cycles per second.

*Functional details of the circuit*

The following is a brief summarization of the functional details of the circuit shown in Figure 3. All symbols and references relate to Figure 3 unless otherwise noted.

Resistors 30 and 32 in series form a voltage divider, the center of which is connected to the plate of the cathode-follower V1, to supply the proper D. C. voltage. Resistor 34 connected from the cathode of V1 and V2 to the minus 150 volt D. C. supply is a common cathode resistor for cathode-follower tube V1 and amplifier tube V2; and amplifier tube V2 is driven through its cathode by the tube V1. Resistor 36 is the plate load resistor for the amplifier tube V2, with connection 37 from the plate of tube V2 to the grid of cathode-follower tube V3. Resistors 38 and 40, connected in series from the cathode of V3 to the minus 150 volt. D. C. supply, form the cathode load resistance for tube V3, and the ratio of resistance of 38 to 40 is such that point 41 is at zero volts D. C. level with respect to ground. The circuit from point 41 to the grid of V2 includes a series connection of variable resistor 42 and the thermistor 20. Thermistor 22 is connected from the grid of V2 to ground. The circuit, consisting of 42, 20 and 22, feeds a degenerative A. C. signal from the cathode of V3 to the grid 26 of V2 and, thus decreases the gain of the oscillation amplifier, or oscillator as it may be called, which is comprised of tubes V1, V2 and V3. The resistance of thermistor 22 is controlled by the current in its heater element 24, said current being supplied by the tube V8. The degenerative signal fed to the grid 26 of V2 is thus controlled by the thermistor 22 whose resistance is controlled by the current from tube V8. Tube V8, therefore, controls the amplitude of oscillation in the oscillator circuit by controlling the gain of the oscillation amplifier. The resistance of thermistor 20 varies in accordance with changes in ambient temperature and thus compensates the degenerative circuit for any change in the resistance of 22 due to changes in ambient temperature. Variable resistor 42 is set during the initial adjustment of the unit to give optimum feed-back signal amplitude. Circuit 43, comprising the resistors 44 and 46, from the cathode of V3 to the minus 300 volt D. C. supply carries A. C. oscillator signal to the grid of cathode-follower tube V6. Variable resistor 44 is set during initial adjustment of the unit to give the proper D. C. voltage level on the grid of tube V6. Tube V6 is a cathode-follower isolation stage between the oscillator and the amplitude-control stage. Resistor 48 is the cathode resistor of V6. V7 is a diode-connected triode tube between the cathode of V6 and the grid of V8. Resistor 50 is a grid-leak resistor for tube V8. V7 is a diode rectifier tube which conducts current only during negative half-cycle of signal on the cathode of V6. Tube V8, the amplifier tube whose plate current controls the resistance of thermistor 22, has its cathode and suppressor grid connected directly to ground. The screen grid of V8 is connected to the plus 150 volt D. C. supply. The plate of V8 is connected to the plus 300 volt D. C. supply through the resistor 52 and the thermistor heater element 24.

Hence, the above combination of V6, V7, V8, and their associated circuitry constitute an amplitude-control amplifier which, by virtue of its amplifying, rectifying, and averaging circuits, has a direct current energy output which is an inverse function of the average magnitude of the oscillations in the output of V3 even though the time of one cycle may be many minutes. Obviously, from the configuration of the voltage dividing network comprising thermistors 20 and 22, and the fact that the output current of V8 is inversely related to oscillation amplitude, the thermistors 20 and 22 must have a negative resistance-temperature coefficient. In other words, the unit comprising the thermistor 20 has but a single circuit consisting of resistive means which will decrease its resistance with a rise of temperature, whereas the unit comprising the thermistor 22 and heating coil 24 has two electrically isolated circuits, namely, the thermistor 22, or primary circuit consisting of resistive means which will decrease its resistance with a rise of temperature and the heating coil 24, or secondary circuit which will supply heat energy to thermistor 22 and thereby reduce its resistance when the oscillations in the output of V3 decrease in magnitude. To those versed in the art, it will be apparent that a fixed inductive reactor could be substituted for thermistor 20 and a saturable reactor with two electrically isolated circuits could be used in place of the unit comprising thermistor 22 and heat coil 24. The controlled or adjustable reactor portion would correspond to the thermistor 22 and the direct current saturating coil would correspond to the heat coil 24. In such a case, the impeditive characteristic would be controlled by magnetic energy instead of heat energy. Also the impedance value of the primary circuit of such a reactor would decrease with an increase of magnetic energy from the secondary circuit.

The series connection of any one of the condensers 10 and resistors 13 and 14, between the cathode of V3 and the grid of V4 forms one-half of a Wein bridge. One branch of the lower half of the Wein bridge is formed by the series connection of resistors 16 and 17 from the grid of V4 to ground. The other branch of the lower half of the Wein bridge is composed of any one of the condensers 12 which is connected from the grid of V4 to the adjustable tap of a potentiometer which is a part of the load resistance 18 in the cathode circuit of V5. Tube V4, whose grid is connected to the center of a Wein bridge, and tube V5 are called the admittance amplifier as explained previously. Tube V4 is a linear amplifier having a cathode bias resistor 54 and a screen grid resistor 56. The plate of V4 is directly connected to the grid of cathode-follower tube V5, and is also connected to the plus 300 volt D. C. supply through plate load resistor 58. Cathode-follower tube V5 is an impedance changer whose cathode load resistance 18 consists of a potentiometer and resistor connected in series from cathode to ground. The potentiometer portion of cathode load resistance 18 is set during initial adjustment to give the required loop gain of the admittance stage and, therefore, to set the required effective value of capacitance 12 as seen looking into the grid terminal of V4. Resistors 14 and 15 are varied simultaneously to adjust the frequency of oscillation in the unit; and in this manner the frequency of oscillation may be set anywhere in a ten-to-one range. Switches 60 and 62 are adjusted simultaneously to set the frequency of oscillation in decade steps, that is, each position of the switch changes the frequency of oscillation by a factor of ten from the previous position.

Circuit 63 carries an A. C. signal from the center of the Wein bridge to the output amplifier V9, phase-inverter V10, and cathode-followers V11 and V12. The center tap of potentiometer 64 can be adjusted to vary the amplitude of signal fed to the grid of V9 and, thus, vary the amplitude of the output signal of the instrument. Tubes V9 and V10 comprise a differential amplifier which also serves as a phase inverter; and this stage converts a single sided signal to a push-pull signal. Resistors 66 and 68 are the plate-load resistors of tubes V9 and V10 respectively. Resistors 72 and 70 are the cathode resistors of tubes V9 and V10 respectively and these resistors decrease the gain of the stage and improve the linearity of the amplification. The series connection of resistors 74 and 76 form a common cathode resistance when connected from the minus 300 volt D. C. supply to the common point of resistors 70 and 72. Resistor 76 is adjusted to change the D. C. voltage level at the cathodes of tubes V9 and V10 and, thus, change the level at the plates, etc., to compensate any D. C. drift of voltage level at the output terminals of the instrument. Resistors 78, 80 and 82, connected in series across the plus 150 volt to minus 150 volt D. C. supply, provide a method for setting the D. C. voltage level at the grid of V10 for balancing purposes; and adjustment of the center tap of potentiometer 80 changes the D. C. balance of voltage level at the output terminals of the instrument. Both the adjutsment of balance and of level, e. g., potentiometers 80 and 76, are required at intervals of instrument use. The plate of V9 is connected to the grid of V11 through the resistor voltage divider 84 and 86, the low side of the divider being connected to the minus 300 volt D. C. supply. Similarly, the plate of V10 is connected to the grid of V12 through the divider 88 and 90. Tubes V11 and V12 are cathode-followers which provide low output impedance for the instrument. Resistor 92 is the cathode resistor of tube V11, and 94 is the cathode resistor for tube V12. The output terminals of the instrument are connected to the cathodes of tubes V11 and V12.

Of course, I do not wish to be limited to the exact showing of Figure 3 as various modifications thereof will be obvious to those skilled in the art. This circuit was shown in exact detail with the thought that a detailed showing would be useful to others in making various applications of the teachings of this disclosure.

The ideas disclosed herein can be applied in a variety of ways to accomplish the same results. For example, it would seem that in the subsonic frequency range, it would be quite feasible to use magnetic amplifiers, saturable reactors, and the like to accomplish similar results to the complete exclusion of vacuum tubes, without departing from the scope of my invention, as set forth in the appended claims.

What I claim is:

1. In a generator of sub-sonic oscillatory electrical energy comprising frequency control means and amplitude control means, in combination: a first voltage amplifying means having nominally 0 degrees phase shift between input and output voltages, a second voltage amplifying means having nominally 180 degrees phase shift between input and output voltages, said first and second amplifying means having their inputs connected in parallel, a series impedance comprising reactive means and resistive means connected in parallel with said amplifier inputs, a positive feedback circuit adapted to transfer energy from the output of said first amplifying means to the inputs of both first and second amplifying means, an output circuit coupling the output of said second amplifying means to the resistive means in said series impedance, the instantaneous relative polarities of the input and output voltages of said second amplifying means cooperating to increase the admittance of said series impedance, and included in said positive feedback circuit, variable adjustable resistive means adapted to adjust the frequency of said generator as desired.

2. A signal generator, comprising: a first voltage amplifying means, with a controllable gain characteristic, having a pair of input terminals, a pair of gain control terminals, and a pair of output terminals; a regenerative feedback circuit coupling electrical energy from the output terminals to the input terminals of said first voltage amplifying means; a frequency determining network included within said regenerative feedback circuit; an impedance member comprising a capacitive reactance element serially connected with a resistor element and constituting a portion of said frequency determining network; a second voltage amplifying means with a substantially linear gain characteristic having a pair of input terminals and a pair of output terminals; the input terminals of said first voltage amplifying means, the input terminals of said second voltage amplifying means, and said impedance member all being connected in parallel; the output terminals of said second voltage amplifying means being connected to the resistive element of said impedance member in such a polarity relation that the sum of the input and output voltages of the second voltage amplifying means will appear across the capacitive reactance element of said impedance member; a degenerative feedback circuit coupling electrical energy from the output terminals of said first voltage amplifying means to the gain control terminals of the same voltage amplifying means; a plurality of serially connected electrically impeditive elements included in said degenerative feedback circuit and at least one of said impeditive elements being adapted to be adjustable in value by means of applied electrical energy; and electrical energy amplifying and control means adapted to apply electrical energy to said adjustable impeditive elements, the magnitude of said electrical energy being a function of the output voltage of said first voltage amplifying means and substantially independent of frequency, said degenerative feedback circuit, its included impeditive elements, and electrical energy amplifying and control means producing a degeneration in said first voltage amplifying means opposing deviations in the output voltage of said first voltage amplifying means.

3. In an electrical oscillation generating system using the RC type of oscillator, in combination: oscillation amplifying means, with a controllable gain characteristic, having a pair of input terminals, a pair of gain control terminals, and a pair of output terminals; a regenerative feedback circuit coupling electrical energy from the output terminals to the input terminals of said oscillation amplifying means; a frequency determining network included within said regenerative feedback circuit; a degenerative feedback circuit coupling electrical energy from the output terminals of said oscillation amplifying means to the gain control terminals of the same oscillation amplifying means; a plurality of serially connected electrically impeditive elements included in said degenerative feedback circuit and at least one of said impeditive elements being adapted to be adjustable in value by means of applied electrical energy; and electrical energy amplifying and control means adapted to apply electrical energy to said adjustable impeditive element, the magnitude of said electrical energy being a function of the output voltage of said oscillation amplifying means and substantially independent of frequency, said degenerative feedback circuit, its included impeditive elements, and electrical energy amplifying and control means producing a degeneration in said oscillation amplifying means opposing deviations in the output voltage of said oscillation amplifying means.

4. A signal generator comprising: a first voltage amplifying means, having at least a pair of input terminals and a pair of output terminals; a regenerative feedback circuit coupling the output terminals to the input terminals of said first voltage amplifying means; a frequency determining network included within said regenerative feedback circuit; an impedance member comprising a reactive element serially connected with a resistive element and constituting a portion of said frequency determining network; a second voltage amplifying means with a substantially linear gain characteristic having a pair of input terminals and a pair of output terminals; the input terminals of said first voltage amplifying means, the input terminals of said second amplifying means, and said impedance member all being connected in parallel; and the output terminals of said second voltage amplifying means being connected to the resistive element of said impedance in such a polarity relationship that the sum of the input and output voltages of the second voltage amplifying means will appear across the reactive element of said impedance member, thereby lowering the response frequency of said frequency determining network.

5. The combination with a sub-sonic oscillation generator, of means to stabilize the amplitude of the generated oscillations comprising a thermally sensitive resistance having a negative resistance-temperature characteristic and being substantially unresponsive to the generated oscillations, a temperature control resistor associated with said thermally sensitive resistance for varying the temperature thereof in a sense opposite to the variations of magnitude of the generated oscillations, means for amplifying, rectifying, and averaging a portion of the generated oscillation energy, and means for supplying said amplified, rectified, and averaged portion of oscillation energy to said control resistor for heating said control resistor.

6. In combination with a sub-sonic oscillation generator of the type having an RC network for frequency determination, an impedance member comprising a capacitive reactance element serially connected with a resistive element and constituting a portion of said frequency determining network, a voltage amplifying means having input terminals and output terminals, the input terminals of said voltage amplifying means and said impedance member being connected in parallel, a resistive load element connected in parallel with the output terminals of said voltage amplifying means and constituting at least a portion of the resistive element within said impedance member, and the relative polarities of the input and output voltages of said voltage amplifying means being such that their sum voltage appears across said capacitive reactance element, thereby increasing the admittance of said impedance member, thus lowering the response frequency of said RC network.

7. In a generator of oscillatory electrical energy comprising frequency control means and amplitude control means, in combination: a first voltage amplifying means having nominally zero degrees phase shift between input and output voltages and having a pair of input terminals, a pair of gain control terminals, and a pair of output terminals; a second voltage amplifying means having nominally 180 degrees phase shift between input and output voltages and having a pair of input terminals and a pair of output terminals; said first and second amplifying means having their input terminals connected in parallel, a series impedance comprising reactive means and resistive means connected in parallel with the input terminals of said first and second voltage amplifying means, a positive feedback circuit adapted to transfer energy from the output terminals of said first amplifying means to the input terminals of both first and second amplifying means, an output circuit coupling the output terminals of said second amplifying means to the resistive means in said series impedance in a manner so that the instantaneous relative polarities of the input and output voltages of said second amplifying means cooperate to increase the admittance of said series impedance, adjustable resistive means included in said positive feedback circuit and manually operable to control the frequency of said generator as desired; electrical energy amplifying, rectifying, and averaging means adapted to receive electrical energy from the output of said first voltage amplifying means, and having an electric current output, the root-mean-square of which is inversely proportional to only the amplitude of the output voltage of said first voltage amplifying means; voltage dividing means comprising serially connected electrically impeditive elements arranged to couple electrical energy from the output terminals to the gain control terminals of said first voltage amplifying means in a degenerative sense; at least one of said electrically impeditive elements having a primary circuit comprising adjustable impedance means substantially unaffected by applied oscillations and a secondary circuit adapted to receive said output current of said electrical energy amplifying means, and adapted to adjust the value of said impedance means in the primary circuit by non-electrical coupling means between said primary and secondary circuits; whereby an initial variation of voltage amplitude in the output of the first voltage amplifying means will result in a variation of degenerative feedback such that said initial variation of voltage amplitude will be opposed.

References Cited in the file of this patent

UNITED STATES PATENTS

| | | |
|---|---|---|
| 2,173,427 | Scott | Sept. 19, 1939 |
| 2,258,128 | Black | Oct. 7, 1941 |
| 2,341,067 | Wise | Feb. 8, 1944 |
| 2,346,396 | Rider | Apr. 11, 1944 |
| 2,466,904 | Lundstrom | Apr. 12, 1949 |
| 2,586,167 | Kamm | Feb. 19, 1952 |